Aug. 27, 1935.  W. H. BLACKMON  2,012,653
MOTOR VEHICLE
Filed June 29, 1934  4 Sheets-Sheet 2

Inventor
W. H. Blackmon
By Clarence A. O'Brien
Attorney

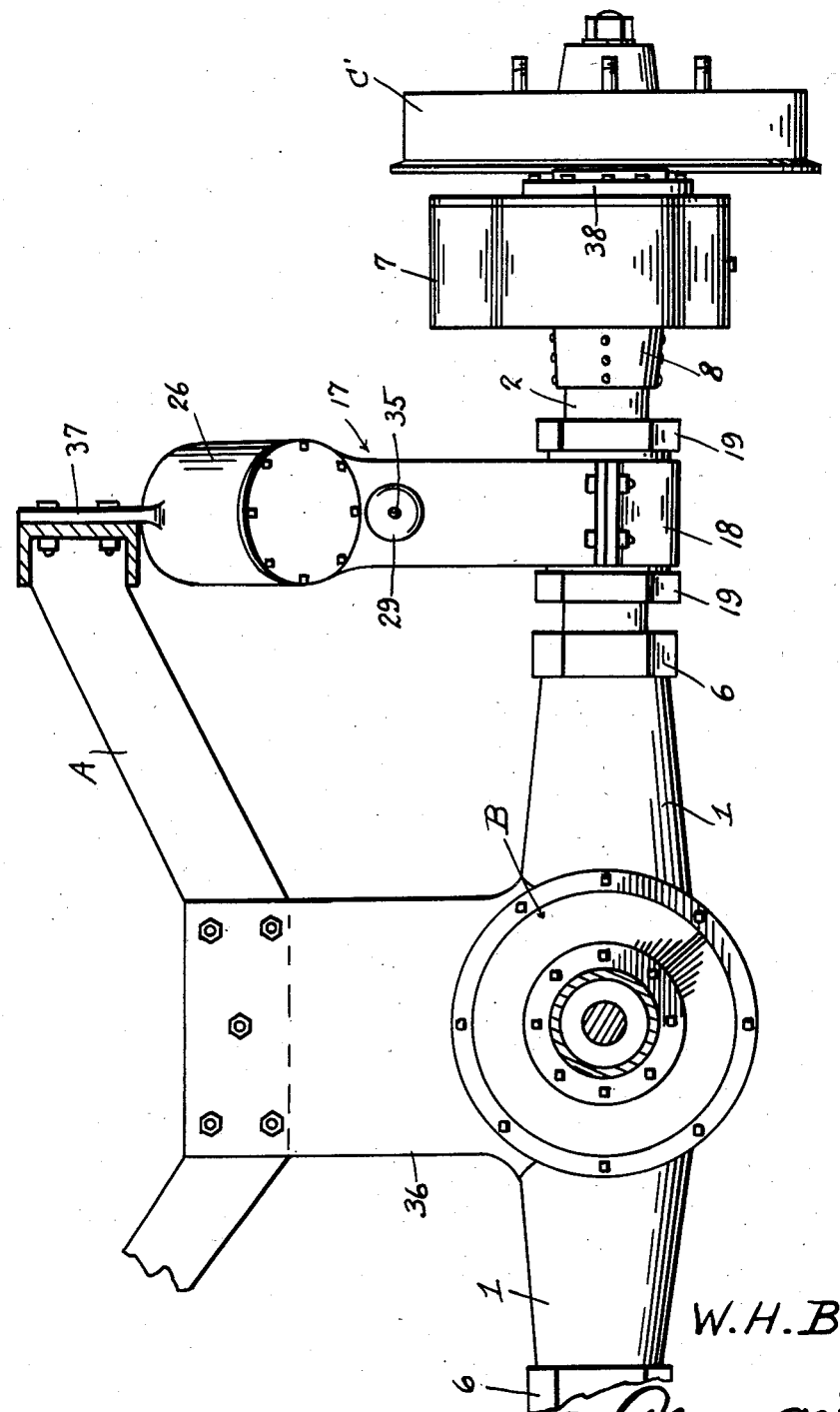

Aug. 27, 1935.  W. H. BLACKMON  2,012,653
MOTOR VEHICLE
Filed June 29, 1934      4 Sheets-Sheet 4

Inventor
W. H. Blackmon
By Clarence A. O'Brien
Attorney

Patented Aug. 27, 1935

2,012,653

UNITED STATES PATENT OFFICE 2,012,653

MOTOR VEHICLE

William H. Blackmon, San Antonio, Tex.

Application June 29, 1934, Serial No. 733,141

2 Claims. (Cl. 180—73)

This invention relates to improvements in motor vehicles, the general object of the invention being to provide supporting means for the rear wheels of the vehicle which are arranged at right angles to the rear axle assembly and rotatably supported from said rear axle assembly for swinging movement in a vertical plane so that the rear wheels can move in a vertical arc and enable the rear axle assembly to be directly supported from the chassis and impart a smooth riding quality to the vehicle.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 3 is a front view of part of the invention and showing how the differential is connected with the chassis.

Figure 8 is a view of the two-part arm forming part of the spring assembly.

Figure 9 is a section on line 9—9 of Figure 8.

Figure 1:
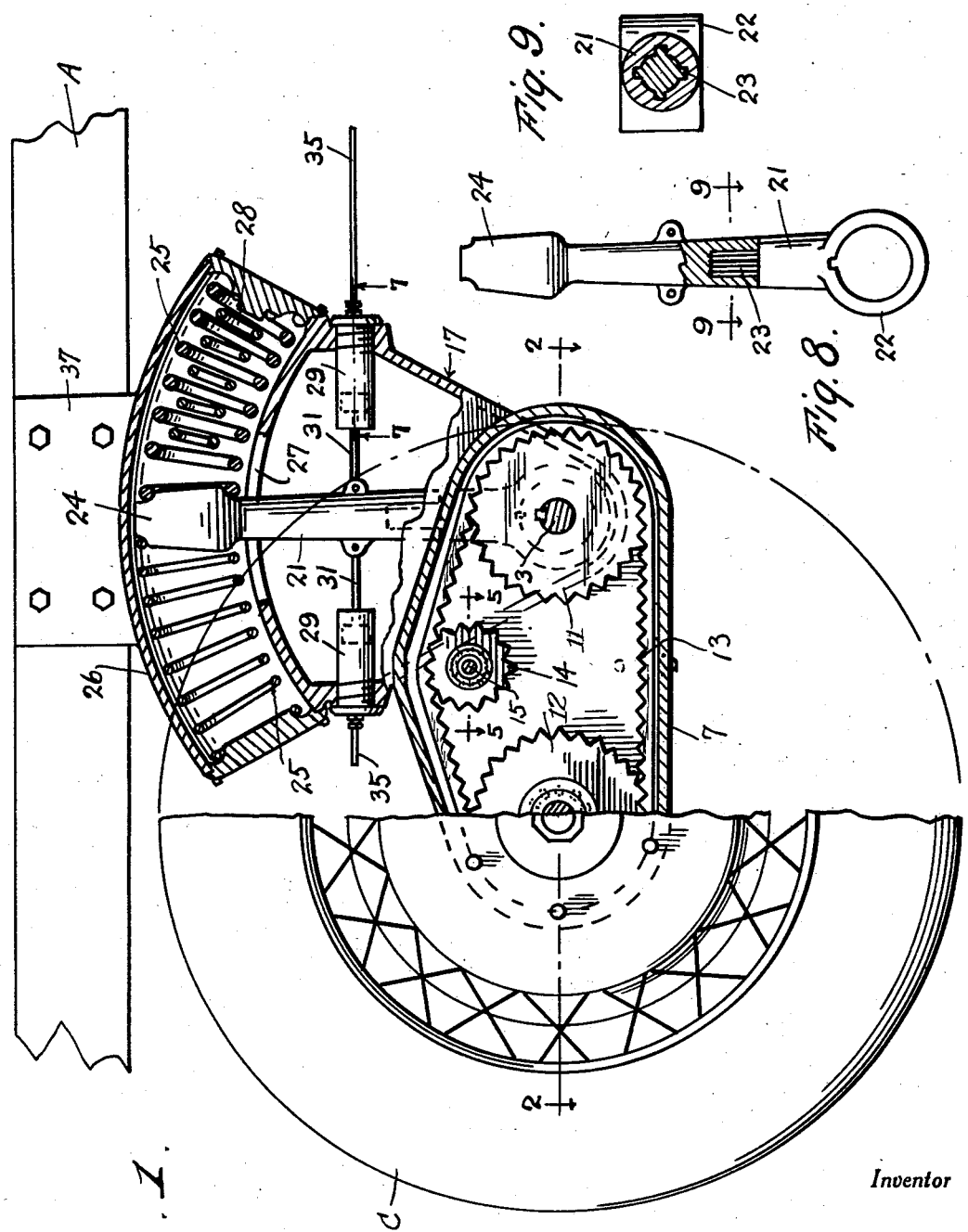
Figure 1 is a fragmentary elevation of the rear portion of a vehicle constructed in accordance with this invention and showing parts in section.
Figure 2:
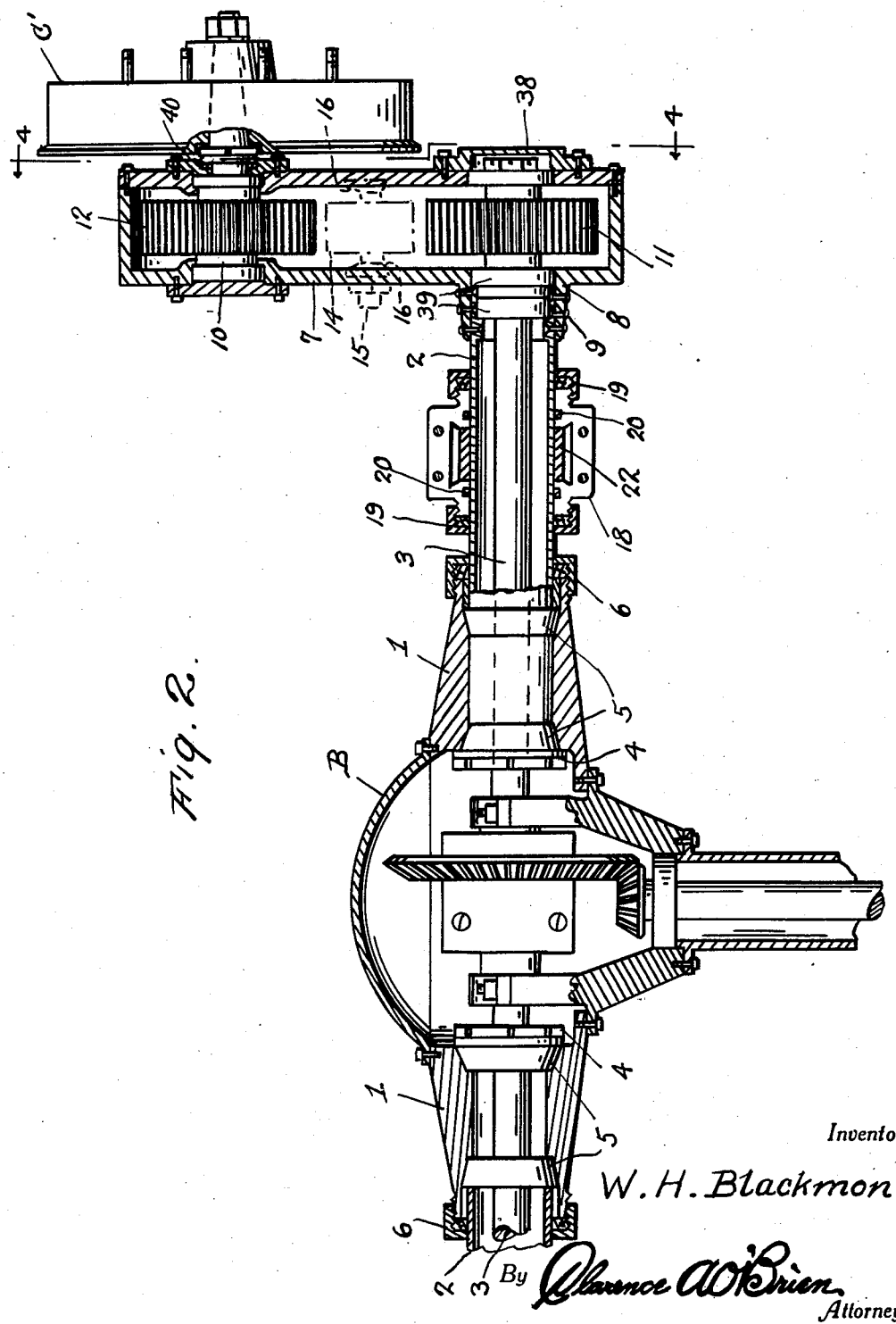
Figure 2 is a section on line 2—2 of Figure 1.
Figure 5:
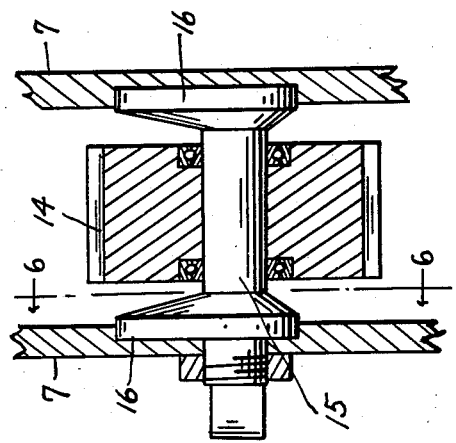
Figure 5 is a section on line 5—5 of Figure 1.

In these drawings, the letter A indicates a part of the chassis of the vehicle and the letter B indicates the differential assembly. The differential housing is provided with the end extension housings 1 in which are rotatably supported the housings 2 through which the rear shafts 3 pass, which are driven in the usual manner from the differential. Each housing 2 is rotatably held in the extension 1 by the nuts and washers, shown generally at 4, and each shaft 3 is provided with the anti-friction means 5 and suitable packing means 6 surround the housing 2 and enclose the outer end of the housing 1. An elongated casing 7 has one end portion formed with a tubular part 8 which is firmly fastened to the outer end of each housing 2, as shown at 9, and a spindle 10 is rotatably supported in the other end part of the casing 7, the spindle projecting from the outer face of the casing and carrying the rear wheel C and the brake drum C'. The outer end of each shaft 3 extends into the casing and a sprocket 11 is attached to this end of the shaft 3 and is located in the casing and a sprocket 12 is fastened to that part of the spindle 10 within the casing. An endless chain 13 passes over the sprockets and over a small idle sprocket 14 which has its shaft 15 adjustably supported from the casing 10 through means of the eccentric 16 so that the sprocket 14 can be adjusted to take up slack of the chain.

Thus it will be seen that the casing 7 of each rear wheel can swing in a vertical arc as it is attached adjacent one end to the housing 2 which is rotatably supported from the differential, and while the drawings show the casing as extending rearwardly, it may extend forwardly from the rear axle assembly.

Figure 7:
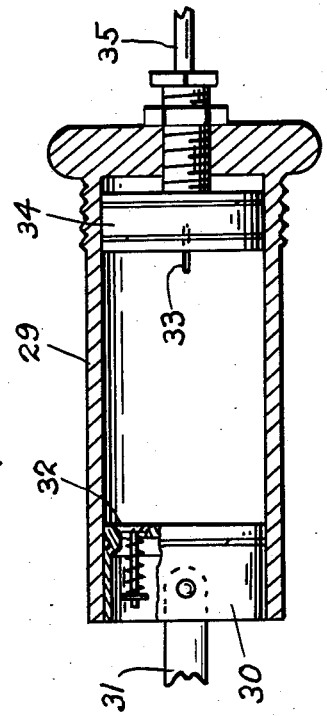
Figure 7 is a section on line 7—7 of Figure 1.
Figure 4:
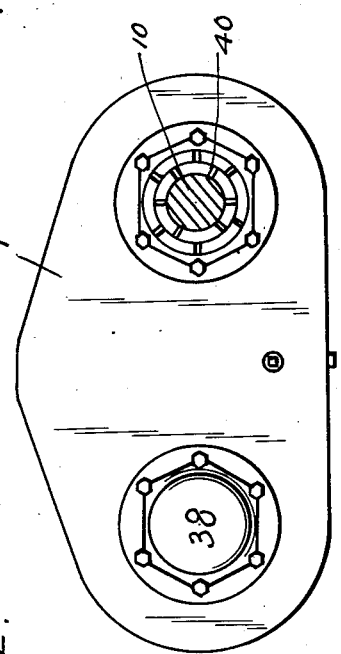
Figure 4 is a section on line 4—4 of Figure 2.
Figure 6:
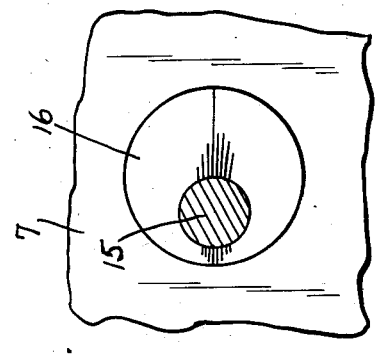
Figure 6 is a section on line 6—6 of Figure 5.

Any suitable form of spring assembly may be used, but I prefer to use the spring assembly shown. This structure comprises a housing 17 of substantially triangular shape and having its lower end shaped to fit over an intermediate part of each housing 2, said lower end being formed with a cap 18 which is bolted to the lower end of the housing 17 and packing means 19 and 20 prevent leakage of oil from the lower part of the housing 17 past the housing 2. A sectional arm 21 is located in the housing 17 and has its lower end of ring shape, as shown at 22, for fitting over a part of the housing 2 and the arm is keyed to the housing for movement therewith. The arm 21 has its two sections splined together, as shown at 23, and the arm has a head 24 at its upper end having sloping faces for engaging the ends of springs 25 located in the arcuate cylinder 26 which forms the upper part of the housing 17 and into which the arm extends through a slot 27. Thus these springs tend to resist oscillatory movement of the arm so that rocking movement of the wheel carrying casing 7 is resisted. A second spring 28 is located in that end of the cylinder toward which the arm moves when the wheel C moves upwardly. I also provide a pair of small cylinders 29 in an intermediate part of the housing 17, each cylinder 29 having its outer end passing through a threaded hole in the front and rear sides of the housing 17 and each cylinder 29 has a piston 30 therein, (see Figure 7), which is connected to the arm 21 by a link 31 and each piston has a port therein closed by a spring pressed valve 32. The housing 17 contains oil and as the piston moves toward the inner end of the cylinder 29, some of this oil will enter the cylinder past the valve 32 and then when the piston is moved by rocking movement of the arm 21, the oil is trapped so that these cylinders and pistons act with the springs to retard swinging movement of the wheel carrying housing 7. A slot 33 is formed in the outer part of each cylinder 29 to place the cylinder in communication with the interior of the housing 17 and this slot is controlled by a piston 34, the position of which can be regulated from a suitable point adjacent the driver's seat by a connection 35 so that the driver can increase or decrease the hydraulic control of the pistons and cylinders on the movement of the arm 21.

A member 36 connects the rear axle assembly with a cross bar of the chassis A and the upper part of the housing 17 is connected to a part of the chassis, as shown at 37.

A plate 38 covers an opening in the housing 7 for exposing the outer end of the shaft 3, so that the parts are accessible for adjustment and repair purposes and packing and anti-friction means, shown generally at 39, are provided for the shaft 3, where it passes into the housing 7, and suitable packing means and anti-friction means, shown generally at 40, are provided for the spindle 10.

While the drawings show a silent chain drive between the wheel spindle and the shaft 3, it will, of course, be understood that any suitable form of driving connection between these parts can be used.

Thus it will be seen that with this invention, the rear axle assembly is firmly connected with the chassis, with the rear wheel supporting members or casings extending either forwardly or rearwardly from the ends of said assembly and arranged at right angles thereto and rotatably supported therefrom so that the rear wheels and their supporting members can swing in vertical arcs so that the rear wheels have what may be termed a free action somewhat similar to the "knee action" of front wheels of vehicles now on the market. This invention imparts smooth riding qualities to the vehicle and all road shocks are not transmitted to the body, but are absorbed by the springs and hydraulic shock absorbers, which resist relative movement between the rear wheel carrying parts and the body. The back seat of the vehicle can be mounted either in front or in back of the rear wheels.

It is thought from the foregoing description that the advantages and novel features of the invention will be readily apparent.

It is to be understood that changes may be made in the construction and in combination and arrangement of the several parts, provided that such changes fall within the scope of the appended claims.

What is claimed is:—

1. In a motor vehicle including differential means, tubular housings having their inner ends rotatably supported by the end parts of said differential means, a casing extending at right angles from the outer end of each tubular member and having one side, adjacent one end thereof, rigidly connected to said outer end of the tubular housing, a spindle carried by the other end part of each casing and extending from the other side thereof, a rear wheel carried by said spindle, a shaft passing through each tubular housing and driven from the differential means with its outer end extending into the casing, means for driving the spindle from the shaft, means for rigidly connecting the differential means to the body of the vehicle, means for resisting relative movement between the rear wheel carrying means and the body of the vehicle, such means including an arm connected with each tubular housing for movement therewith, a housing connected with a part of the body and enclosing the arm, and means in said last housing for resisting movement of the arm.

2. In a motor vehicle including differential means, tubular housings having their inner ends rotatably supported by the end parts of said differential means, a casing extending at right angles from the outer end of each tubular member and having one side, adjacent one end thereof, rigidly connected to said outer end of the tubular housing, a spindle carried by the other end part of each casing and extending from the other side thereof, a rear wheel carried by said spindle, a shaft passing through each tubular housing and driven from the differential means with its outer end extending into the casing, means for driving the spindle from the shaft, means for rigidly connecting the differential means to the body of the vehicle, means for resisting relative movement between the rear wheel carrying means and the body of the vehicle, such means including an arm connected with each tubular housing for movement therewith, a housing connected with a part of the body and enclosing the arm, means for resisting movement of the arm, such means including spring means in said last housing and hydraulic means.

WILLIAM H. BLACKMON.